(12) United States Patent
Keating et al.

(10) Patent No.: US 11,180,871 B2
(45) Date of Patent: Nov. 23, 2021

(54) FABRIC ITEMS HAVING STRANDS OF ADJUSTABLE APPEARANCE

(71) Applicant: Apple Inc., Cupertino, CA (US)

(72) Inventors: Steven J. Keating, Sunnyvale, CA (US); Daniel D. Sunshine, Sunnyvale, CA (US); Kathryn P. Crews, Menlo Park, CA (US); Daniel A. Podhajny, San Jose, CA (US); Nicholas G. L. Merz, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 310 days.

(21) Appl. No.: 15/941,287

(22) Filed: Mar. 30, 2018

(65) Prior Publication Data

US 2018/0363173 A1     Dec. 20, 2018

Related U.S. Application Data

(60) Provisional application No. 62/519,379, filed on Jun. 14, 2017.

(51) Int. Cl.
*D03D 15/44* (2021.01)
*G02F 1/167* (2019.01)
(Continued)

(52) U.S. Cl.
CPC ......... *D03D 15/44* (2021.01); *D03D 1/0088* (2013.01); *D03D 15/54* (2021.01); *D03D 15/60* (2021.01);
(Continued)

(58) Field of Classification Search
CPC .......... D03D 15/0083; D03D 15/0033; D03D 1/0088; D03D 15/533; D03D 15/60;
(Continued)

(56) References Cited

U.S. PATENT DOCUMENTS 3,792,308 A * 2/1974 Ota ........................ G02F 1/167
                                                    315/150
5,019,232 A    5/1991 Wilson et al.
(Continued)

FOREIGN PATENT DOCUMENTS

JP          2004070206 A    3/2004
KR       20170039967 A    4/2017

*Primary Examiner* — Jennifer A Steele
(74) *Attorney, Agent, or Firm* — Treyz Law Group, P.C.; G. Victor Treyz; Kendall W. Abbasi

(57) ABSTRACT

A fabric-based item may include fabric formed from intertwined strands of material such as intertwined strands of tubing. The strands of material may include electrophoretic ink formed from charged nanoparticles of different colors in fluid. The electrophoretic ink may be contained within strands of tubing or may be enclosed within encapsulation structures such as encapsulation spheres. Encapsulation spheres or other encapsulation structures may be embedded in clear polymer binder within tubing or other strands. Electroluminescent particles may be included in the clear polymer binder. Electric fields can be applied to the electrophoretic ink in a given area of the fabric using conductive strands that overlap the area, using conductive electrodes such as transparent conductive electrodes on strands of tubing, using coaxial electrodes, or using other electrode structures.

17 Claims, 15 Drawing Sheets

(51) Int. Cl.
*D03D 1/00* (2006.01)
*G02F 1/16757* (2019.01)
*G02F 1/1685* (2019.01)
*D03D 15/54* (2021.01)
*D03D 15/60* (2021.01)
*D04B 1/14* (2006.01)

(52) U.S. Cl.
CPC .............. *D04B 1/14* (2013.01); *G02F 1/167* (2013.01); *G02F 1/1685* (2019.01); *G02F 1/16757* (2019.01); *D10B 2401/16* (2013.01); *D10B 2401/18* (2013.01); *D10B 2401/20* (2013.01)

(58) Field of Classification Search
CPC .......... D03D 15/54; G02F 1/167; D04B 1/14; D10B 2401/16; D10B 2401/20; D10B 2401/18; H01L 31/00; H01L 51/00
See application file for complete search history.

(56) References Cited

U.S. PATENT DOCUMENTS

| | | | |
|---|---|---|---|
| 5,803,963 | A | 9/1998 | Dry |
| 6,072,619 | A * | 6/2000 | Kiryuschev ............... G02F 1/01 359/245 |
| 6,607,994 | B2 | 8/2003 | Soane et al. |
| 7,867,468 | B1 | 1/2011 | Haddon et al. |
| 2002/0149656 | A1 | 10/2002 | Nohr et al. |
| 2003/0006142 | A1* | 1/2003 | Nair ................. G01N 27/44704 204/631 |
| 2007/0197115 | A1* | 8/2007 | Eves .................... D03D 1/0088 442/194 |
| 2008/0316580 | A1* | 12/2008 | Gillies ................... G02F 1/167 359/296 |
| 2012/0274616 | A1* | 11/2012 | Scribner ........... G02F 1/133305 345/205 |
| 2014/0062289 | A1* | 3/2014 | Kiryuschev ............. G06F 3/147 313/503 |
| 2014/0084045 | A1 | 3/2014 | Yang et al. |
| 2018/0271180 | A1* | 9/2018 | Kim ....................... G06Q 50/04 |

\* cited by examiner

FABRIC ITEMS HAVING STRANDS OF ADJUSTABLE APPEARANCE

This application claims the benefit of provisional patent application No. 62/519,379, filed Jun. 14, 2017, which is hereby incorporated by reference herein in its entirety.

FIELD

This relates generally to fabric-based items and, more particularly, to fabric-based items having adjustable components.

BACKGROUND

It may be desirable to form bags, furniture, clothing, wearable electronic devices, and other items from materials such as fabric. If care is not taken, however, fabric-based items may not offer desired features. For example, fabric-based items may not include visual output devices to provide a user with visual information or may include visual output devices that are unattractive, bulky, and heavy.

SUMMARY

A fabric-based item may include fabric formed from intertwined strands of material such as intertwined strands of tubing and other strands of material. The appearance of portions of the fabric can be adjusted using control circuitry in the fabric-based item.

The strands of material may include tubing with electrophoretic ink formed from charged nanoparticles of different colors. Electric fields can be applied to the electrophoretic ink using the control circuitry to change the appearance of the fabric.

Charged nanoparticles and fluid may be contained within strands of tubing or may be enclosed within encapsulation structures such as encapsulation spheres. Encapsulation spheres or other encapsulation structures may be embedded in clear polymer binder within tubing or other structures in the fabric. Electric fields can be applied in a given area of the fabric using conductive strands that overlap the area, using conductive electrodes such as transparent conductive electrodes on strands of tubing, using coaxial electrodes, or using other electrode structures.

If desired, electroluminescent particles may be incorporated into the fabric. For example, electroluminescent particles may be included in the clear polymer binder in strands of tubing.

DETAILED DESCRIPTION

Figure 1:
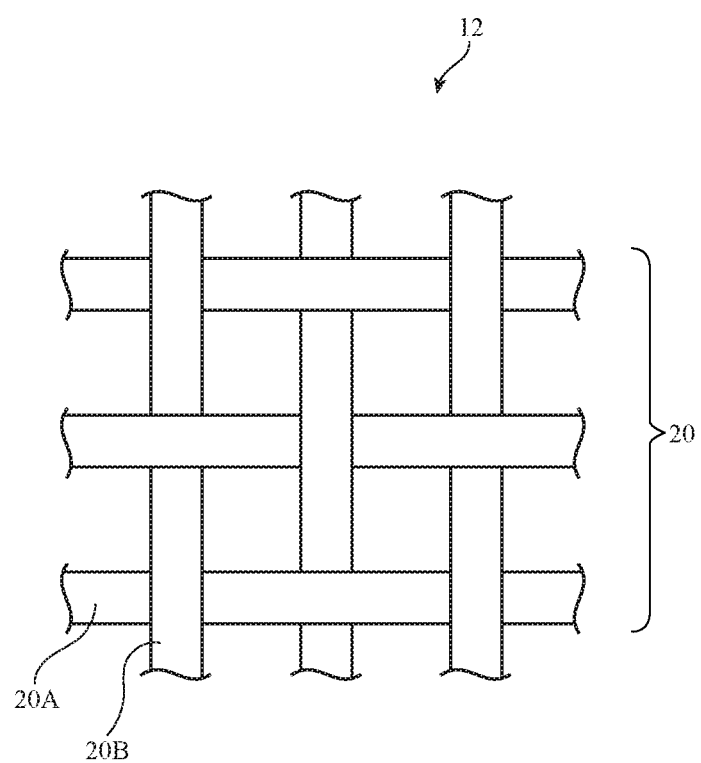
FIG. 1 is a side view of illustrative woven fabric in accordance with an embodiment.

Items may be based on fabric. A cross-sectional side view of illustrative woven fabric 12 is shown in FIG. 1. As shown in FIG. 1, fabric 12 may include strands 20 such as warp strands 20A and weft strands 20B. In the illustrative configuration of FIG. 1, fabric 12 has a single layer of woven strands 20. Multi-layer fabric constructions may be used for fabric 12 if desired.

Figure 2:
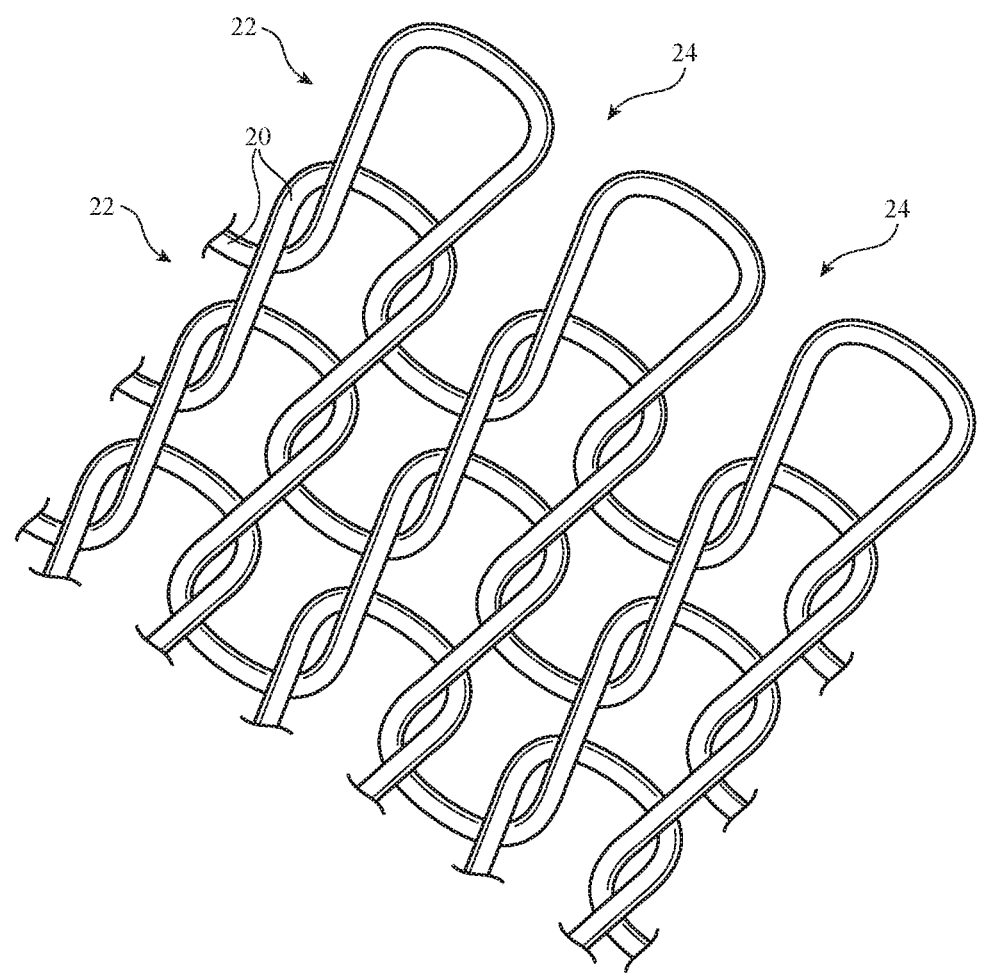
FIG. 2 is a top view of illustrative knit fabric in accordance with an embodiment.

As shown in FIG. 2, fabric 12 may be a knit fabric. In the illustrative configuration of FIG. 2, fabric 12 has a single layer of knit strands 20 that form horizontally extending rows of interlocking loops (courses 22) and vertically extending wales 24. Other types of knit fabric may be used in item 10, if desired.

Figure 3:
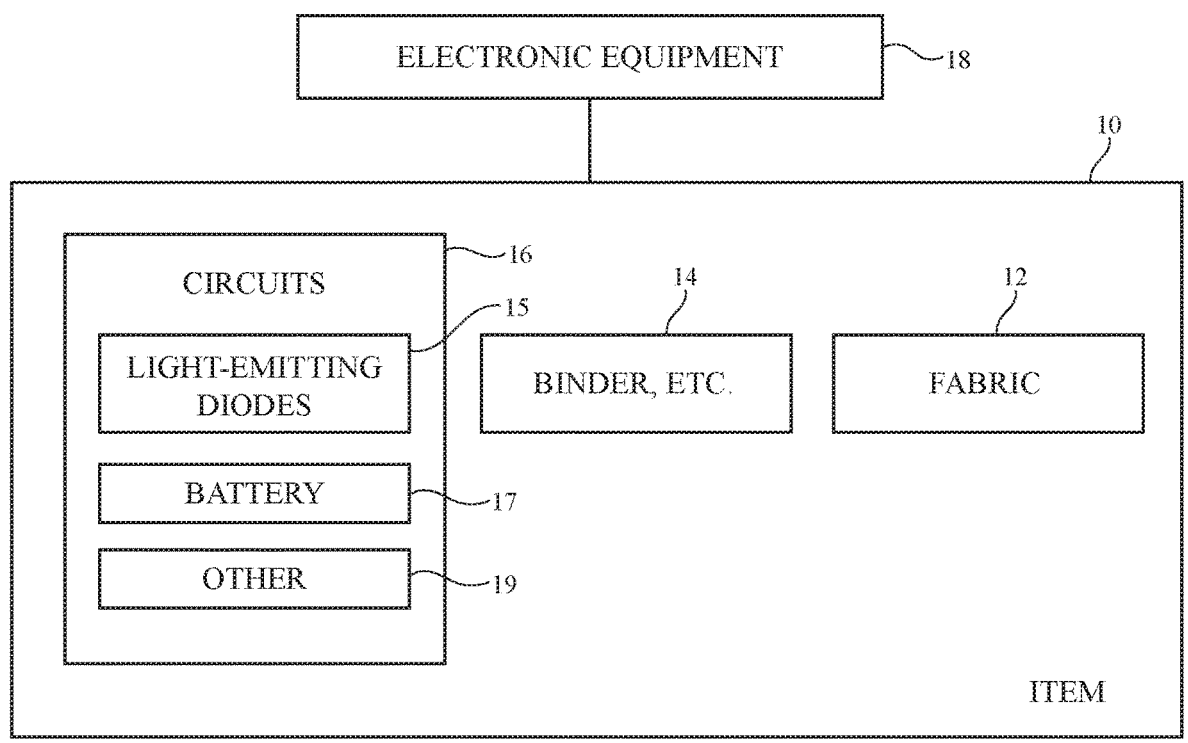
FIG. 3 is a schematic diagram of an illustrative fabric-based item in accordance with an embodiment.

An illustrative fabric-based item is shown in FIG. 3. Fabric-based item 10 may be an electronic device or an accessory for an electronic device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, a remote control, an embedded system such as a system in which fabric-based item 10 is mounted in a kiosk, in an automobile, airplane, or other vehicle, other electronic equipment, or may be equipment that implements the functionality of two or more of these devices. If desired, item 10 may be a removable external case for electronic equipment, may be a strap, may be a wrist band or head band, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating (e.g., cushions or other seating structures), may be part of an item of clothing or other wearable item (e.g., a hat, belt, wrist band, headband, sock, glove, shirt, pants, etc.), or may be any other suitable fabric-based item.

Item 10 may include intertwined strands of material that form fabric 12. Fabric 12 may form all or part of a housing wall or other layer in an electronic device, may form internal structures in an electronic device, or may form other fabric-based structures. Item 10 may be soft (e.g., item 10 may have a fabric surface that yields to a light touch), may have a rigid feel (e.g., the surface of item 10 may be formed from a stiff fabric), may be coarse, may be smooth, may have ribs or other patterned textures, and/or may be formed as part of a device that has portions formed from non-fabric structures of plastic, metal, glass, crystalline materials, ceramics, or other materials.

The strands of material in fabric 12 may be single-filament strands (sometimes referred to as fibers or monofilaments), may be yarns or other strands that have been formed by intertwining multiple filaments (multiple monofilaments) of material together, or may be other types of strands (e.g., tubing that carries fluids such as gases or liquids). The strands may include extruded strands such as extruded monofilaments and yarn formed from multiple extruded monofilaments. Monofilaments for fabric 12 may include polymer monofilaments and/or other insulating monofilaments and/or may include bare wires and/or insulated wires. Monofilaments formed from polymer cores with metal coatings and monofilaments formed from three or more layers (cores, intermediate layers, and one or more outer layers each of which may be insulating and/or conductive) may also be used.

Yarns in fabric 12 may be formed from polymer, metal, glass, graphite, ceramic, natural materials as cotton or bamboo, or other organic and/or inorganic materials and combinations of these materials. Conductive coatings such as metal coatings may be formed on non-conductive material. For example, plastic yarns and monofilaments in fabric 12 may be coated with metal to make them conductive. Reflective coatings such as metal coatings may be applied to make yarns and monofilaments reflective. Yarns may be formed from a bundle of bare metal wires or metal wire intertwined with insulating monofilaments (as examples).

Strands of material may be intertwined to form fabric 12 using intertwining equipment such as weaving equipment, knitting equipment, or braiding equipment. Intertwined strands may, for example, form woven fabric, knit fabric, braided fabric, etc. Conductive strands and insulating strands may be woven, knit, braided, or otherwise intertwined to form contact pads that can be electrically coupled to conductive structures in item 10 such as the contact pads of an electrical component. The contacts of an electrical component may also be directly coupled to an exposed metal segment along the length of a conductive yarn or monofilament.

Conductive and insulating strands may also be woven, knit, or otherwise intertwined to form conductive paths. The conductive paths may be used in forming signal paths (e.g., signal buses, power lines, etc.), may be used in forming part of a capacitive touch sensor electrode, a resistive touch sensor electrode, or other input-output device, or may be used in forming other patterned conductive structures. Conductive structures in fabric 12 may be used in carrying power signals, digital signals, analog signals, sensor signals, control signals, data, input signals, output signals, or other suitable electrical signals.

Item 10 may include additional mechanical structures 14 such as polymer binder to hold strands in fabric 12 together, support structures such as frame members, housing structures (e.g., an electronic device housing), and other mechanical structures.

Circuitry 16 may be included in item 10. Circuitry 16 may include electrical components that are coupled to fabric 12, electrical components that are housed within an enclosure formed by fabric 12, electrical components that are attached to fabric 12 using welds, solder joints, adhesive bonds (e.g., conductive adhesive bonds such as anisotropic conductive adhesive bonds or other conductive adhesive bonds), crimped connections, or other electrical and/or mechanical bonds. Circuitry 16 may include metal structures for carrying current, electrical components such as integrated circuits, light-emitting diodes (see, e.g., light-emitting diodes 15), battery 17, and other components 19 (e.g., sensors, controller circuitry for applying currents and/or magnetic fields to materials, and other electrical devices). Control circuitry in circuitry 16 (e.g., control circuitry formed from one or more integrated circuits such as microprocessors, microcontrollers, application-specific integrated circuits, digital signal processors, etc.) may be used to control the operation of item 10 by controlling electrically controllable (electrically adjustable) components in circuitry 16 and may be used to support communications with item 18 and/or other devices.

Item 10 may interact with additional items such as electronic equipment 18. Items such as equipment 18 may be attached to item 10 or item 10 and equipment (item) 18 may be separate items that are configured to operate with each other (e.g., when one item is a case and the other is a device that fits within the case, etc.). Circuitry 16 may include antennas and other structures for supporting wireless communications with item 18. Item 18 may also interact with item 10 using a wired communications link or other connection that allows information to be exchanged.

In some situations, item 18 may be an electronic device such as a cellular telephone, computer, or other portable electronic device and item 10 may form a cover, case, bag, or other structure that receives the electronic device in a pocket, an interior cavity, or other portion of item 10. In other situations, item 18 may be a wrist-watch device or other electronic device and item 10 may be a strap or other fabric-based item that is attached to item 18 (e.g., item 10 and item 18 may be used together to form a fabric-based item such as a wristwatch with a strap). In still other situations, item 10 may be an electronic device (e.g., a wearable device such as a wrist device, clothing, etc.), fabric 12 may be used in forming the electronic device, and additional items 18 may include accessories or other devices that interact with item 10. Signal paths formed from conductive yarns and monofilaments (e.g., insulated and bare wires) may be used to route signals in item 10 and/or item(s) 18.

The fabric that makes up item 10 may be formed from strands that are intertwined using any suitable intertwining equipment. With one suitable arrangement, which may sometimes be described herein as an example, fabric 12 may be woven fabric formed using a weaving machine. In this type of illustrative configuration, fabric may have a plain weave, a basket weave, a satin weave, a twill weave, or variations of these weaves, may be a three-dimensional woven fabric, or may be other suitable fabric. With other suitable arrangements, fabric 12 is knit or braided.

Fabric-based item 10 may include non-fabric materials (e.g., structures such as structures 14 that are formed from plastic, metal, glass, ceramic, crystalline materials such as sapphire, etc.). These materials may be formed using molding operations, extrusion, machining, laser processing, and other fabrication techniques. In some configurations, some or all of fabric-based item 10 may include one or more layers of material. The layers in item 10 may include layers of polymer, metal, glass, fabric, adhesive, crystalline materials, ceramic, substrates on which components have been mounted, patterned layers of material, layers of material containing patterned metal traces, thin-film devices such as transistors, and/or other layers.

Figure 4:
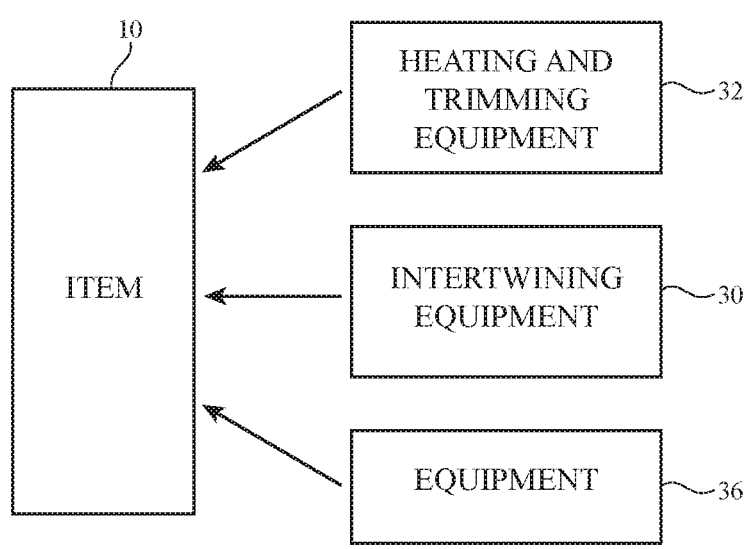
FIG. 4 is a diagram of illustrative equipment for forming a fabric-based item in accordance with an embodiment.

FIG. 4 is a diagram of illustrative equipment that may be used in forming fabric-based item 10. As shown in FIG. 4, this equipment may include heating and/or trimming tools such as heating and trimming equipment 32. Cutting equipment such as a trimming tool in equipment 32 (e.g., a mechanical cutting tool, a laser cutting tool, or other equipment for cutting yarn) may be used in cutting fabric 12. For example, a trimming tool may be used in cutting away undesired portions of fabric 12 and/or portions of strands in fabric 12.

A heating tool in equipment 32 may be used in applying heat to tubing and other strands of material in fabric 12. The heating tool may include a laser for supplying heat, a reflow oven, an inductive heating tool for heating solder, a heat gun, a lamp, hot bar equipment, a soldering iron tip, equipment for forming heat by applying current (ohmic heating current) to a conductive strand, or may include other heating equipment.

Additional equipment such as equipment 36 may be used to help form fabric 12, strands of material for fabric 12, circuitry that is coupled to conductive structures in fabric 12, electrical components, housing structures, and other structures for forming item 10. Equipment 36 may, for example, include equipment for cutting fabric, equipment for laminating fabric to layers of plastic, metal, and/or other materials, equipment for coating strands of material and/or for depositing layers of material on fabric 12, equipment for extruding strands of material, equipment for placing fluid in tubing, equipment for mounting integrated circuits, light-emitting diodes, sensors, buttons, and other electrical circuitry to fabric 12 and/or other portions of item 10, machining equipment for machining parts of item 10, robotic assembly equipment, and/or other equipment for forming item 10. The equipment of FIG. 4 may be used to form strands 20, to form fabric 12, to process fabric 12, to integrate circuitry 16, fabric 12, and/or additional structures 14 into item 10, and/or to perform other fabrication and processing operations on item 10.

Intertwining equipment such as tool (equipment) 30 may include equipment such as braiding equipment, knitting equipment, and weaving equipment. Tool 30 may be used in forming fabric 12 from strands of material. The strands that are intertwined by tool 30 may include strands of tubing that include electrophoretic ink. Electrophoretic ink contains charged nanoparticles of different colors suspended in a fluid such as oil. Electric fields can be used to control movement of the nanoparticles and therefore the appearance of an article that includes the electrophoretic ink.

With one illustrative configuration, electrophoretic ink is contained in encapsulation structures such as encapsulating spheres formed from glass or plastic. The spheres or other encapsulation structures containing the electrophoretic ink may sometimes be referred to as Janus particles. Janus particles may be incorporated into strands of tubing in fabric 12. If desired, electrophoretic ink that is not encapsulated in encapsulation spheres or other encapsulation structures may be placed directly into strands of tubing or other structures that are incorporated into fabric 12.

The charged nanoparticles in electrophoretic ink may include nanoparticles of a first charge (e.g., positively charged nanoparticles) and may include nanoparticles of a second charge (e.g., negatively charged nanoparticles). The particles with the first charge may have a first color (e.g., white or other color) and the particles with the second charge may have a second color (e.g., black or other color). The opposing charges on nanoparticles of different colors can be exploited to change the appearance of a Janus particle or other electrophoretic ink structure under the control of control circuitry in item 10 such as control circuitry 16. For example, electrodes may be used to supply an adjustable electric field to strands of tubing, thereby causing the nanoparticles to migrate via electrophoresis in accordance with their charge polarity and change the appearance of the tubing.

Figure 5:
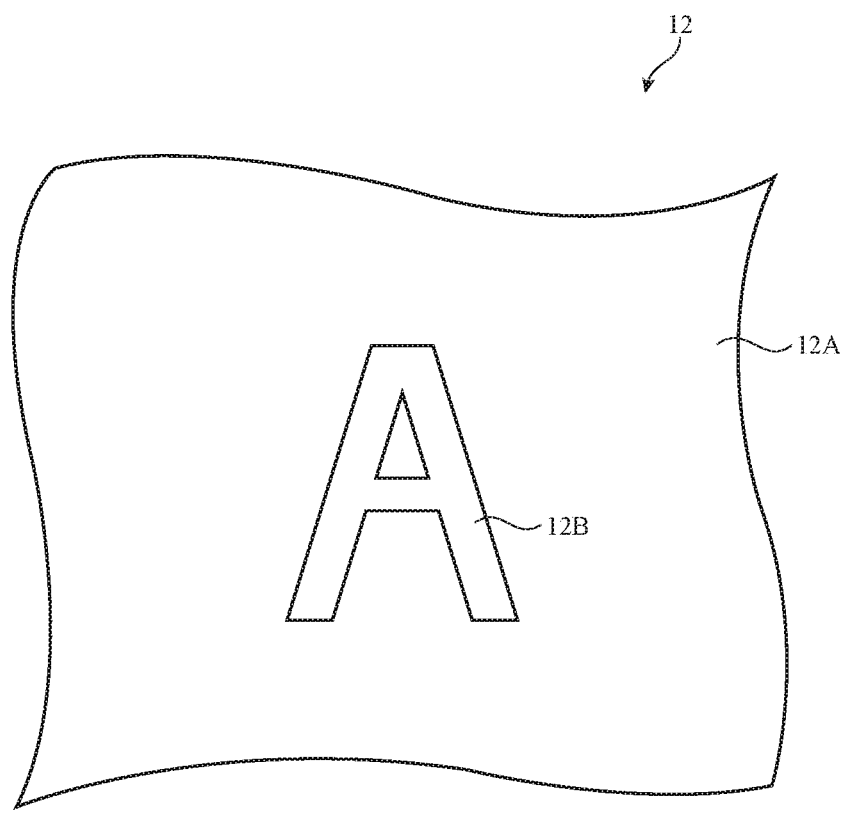
FIG. 5 is a diagram of an illustrative fabric with electrophoretic material that is displaying information for a user in accordance with an embodiment.

By controlling which nanoparticles in the tubing face towards a user of fabric-based item 10, control circuitry 16 can dynamically change the appearance of one or more portions of fabric 12 (e.g., to generate an icon, to adjust the appearance of a portion of fabric used as a status indicator, to create text dynamically, etc.). As shown in FIG. 5, for example, adjustments can be made to electrophoretic ink in strands in fabric 12 that cause the strands in portion 12B of fabric 12 to have a different appearance than the strands in portion 12A of fabric 12.

As an example, tubing in fabric 12 may have electrophoretic ink with white and black portions. When no control signals are applied, all of fabric 12 may appear black. When control signals are applied to the electrophoretic ink in region 12B, the nanoparticles in region 12B may segregate so that the white nanoparticles in the ink become visible in region 12B. This renders region 12B white, which contrasts with the black particle portions that are visible in portion 12A. In this way, control circuitry 16 can create alphanumeric letters and other symbols (sometimes referred to as glyphs), can change the status of a status indicator pattern (e.g., from "ON" to "OFF" or to change the number of bars shown in a bar-type indicator), can display images (e.g., in configurations in which the electrophoretic ink structures in fabric 12 are overlapped by a grid of electrodes that form addressable pixels), and/or to otherwise selectively adjust the appearance of fabric 12 in localized areas.

Individually adjustable areas of fabric 12 such as region 12B may be created using addressable subregions (pixels) and/or dedicated electrodes of predetermined shapes and may have any suitable shapes. These areas may be used as adjustable key labels (e.g., to change glyphs on a keyboard when changing the operating mode of the keyboard between different language modes or other operating modes), may be used to adjust virtual button labels in areas of fabric 12 that contain capacitive touch sensors or other input devices, may be used to adjust alert text such as "voice mail received" or "email message received" that is presented for a user on a device housing formed from fabric 12, may be used to display a heart rate data or other health data when item 10 is a health monitoring device, may be used to display a watch face or a digital representation of the current time, or may be used to display other text, graphics, and/or images.

Figure 6:
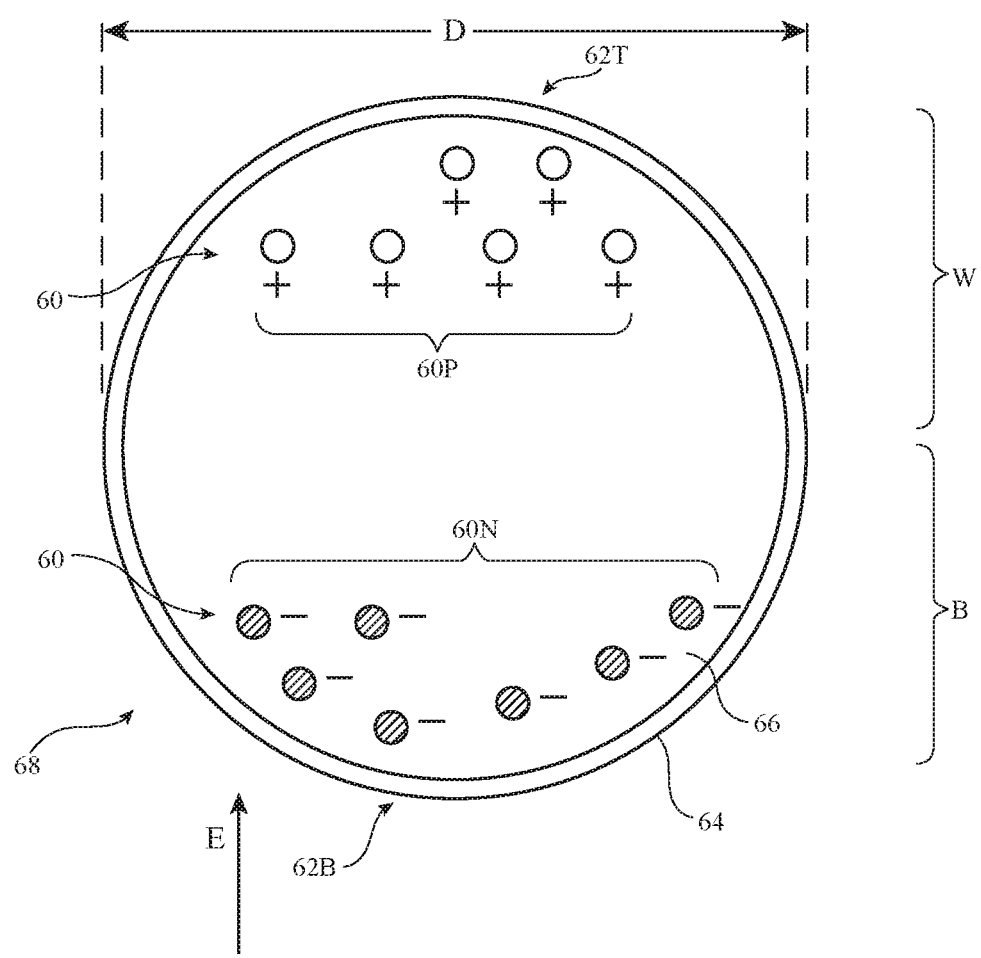
FIG. 6 is a cross-sectional side view of an illustrative Janus particle having electrophoretic ink in an encapsulation sphere in accordance with an embodiment.

FIG. 6 is a cross-sectional side view an illustrative encapsulation structure containing electrophoretic ink (sometimes referred to as a Janus particle). In the illustrative configuration of FIG. 6, Janus particle 68 includes nanoparticles 60 (e.g., thousands of charged nanoparticles 60) in cavity 66 within encapsulation structure 64. Encapsulation structure 64 may be formed from a hollow sphere of glass, plastic, or other transparent material or other hollow encapsulation structure having an encapsulation structure wall that surrounds cavity 66. In the illustrative configuration of FIG. 6, encapsulation structure 64 is spherical. The diameter of spherical encapsulation structure 64 of FIG. 6 may be, as an example, 20-100 microns, at least 10 microns, less than 200 microns, or other suitable diameter. The thickness of the wall of encapsulation structure 64 may be 1-30 microns, at least 0.5 microns, at least 5 microns, at least 50 microns, or at least 200 microns, less than 800 microns, less than 100 microns, less than 15 microns, or other suitable wall thickness.

Interior cavity 66 of encapsulation structure 64 may be filled with transparent fluid such as oil. Charged nanoparticles 60 may be suspended in this fluid to form electrophoretic ink. There are multiple types of nanoparticles in the ink each with a different associated appearance (e.g., a different color, such as white, black, red, green, blue, etc.) There may be any suitable number of different type of nanoparticles and these nanoparticles may have any suitable colors. In the example of FIG. 6, nanoparticles 60 include white nanoparticles 60P and black nanoparticles 60N. Nanoparticles 60P and 60N may have electric charge of opposite polarity. For example, nanoparticles 60P may carry positive charge and nanoparticles 60N may carry negative charge. As a result, when an electric field E is applied across Janus particle 68, nanoparticles 60P will move towards surface 62T of Janus particle 68 and nanoparticles 60N will move towards surface 62L of Janus particle 68. This renders surface 62T white and renders surface 62B black. By reversing the polarity of applied electric field E, the particles may be moved in opposite directions, so that surface 62T becomes black while surface 62B becomes white.

In the example of FIG. 6, electrophoretic ink is formed from charged nanoparticles 60N and 60P and the fluid of cavity 66. This electrophoretic ink is contained in spherical encapsulation structure 64. If desired, nanoparticles 60N and 60P and the fluid of cavity 66 may be enclosed in other types of structures (e.g., encapsulation structures other than microspheres such as circular tubing, strip-shaped tubes, gaps between encapsulation layers in a planar encapsulation structure, and/or other structures).

Figure 7:
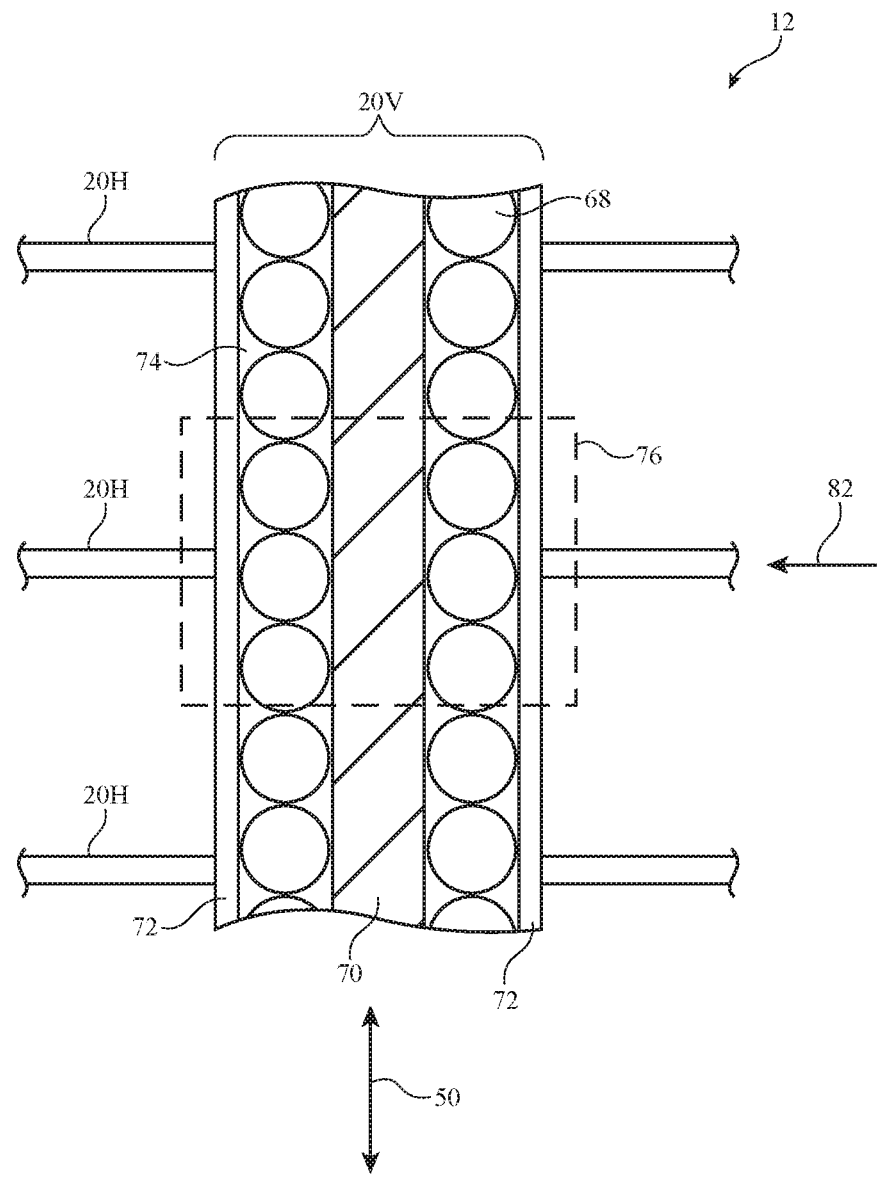
FIG. 7 is a diagram of an illustrative strand with electrophoretic ink overlapping conductive strands that are configured to supply control signals to the electrophoretic ink in accordance with an embodiment.

FIG. 7 is a top view of illustrative fabric 12 with electrophoretic ink structures. The top view of FIG. 7 includes a cross-section of strand 20V and shows how strands 20H may run orthogonally to strands such as strand 20V. Strands 20H may be conductive strands. Strands such as strand 20V may contain electrophoretic ink (e.g., nanoparticles 60 in fluid in the interior of particles 68). In the example of FIG. 7, particles 68 include encapsulation structures containing electrophoretic ink (e.g., nanoparticles 60 in fluid). Strand 20V is formed from tubing extending along longitudinal axis 50. Tubing wall 72 surrounds a channel that forms an elongated interior region extending along longitudinal axis 50. Particles 68 are located in this interior portion of strand 20V between tubing wall 72 and center conductor 70, so that tubing wall 72 surrounds particles 68 and center conductor 70. Tubing wall 72 may be formed from a clear conductive material (e.g., indium tin oxide, indium tin oxide on a clear polymer wall, conductive polymer, metal that is sufficiently thin to be transparent, etc.) to help distribute electric fields or may be formed from an insulating material (e.g., clear polymer).

Center conductor 70 may be formed from a conductive strand of material such as conductive multifilament yarn, a conductive monofilament such as a metal wire, or other conductive strand and may run along the center axis (longitudinal axis) of strand 20V (e.g., along dimension 50 in the example of FIG. 7). During operation, center conductor 70 may be held at a fixed potential (e.g., center conductor 70 may be grounded). Particles 68 and center conductor 70 may be supported in binder 74 (e.g., a clear polymer such as a clear insulating polymer) within the channel formed by the hollow interior of tubing 72. When it is desired to change the appearance of an area of fabric 12 such as region 76 that overlaps the intersection between strand 20V and one of strands 20H (e.g., the strand at position 82), a voltage (e.g., a non-ground voltage) may be applied to that strand by control circuitry in item 10 (see, e.g., circuitry 16 of FIG. 3). This applies an electric field to the electrophoretic ink in particles 68 in the portion of fabric 12 in overlap region 76. In response to the applied electric field in region 76, the appearance of region 76 changes (e.g., from black to white, etc.).

Arrangements of this type may be used to form arrays of pixels that are individually adjustable by control circuitry 16 and/or may be used in configurations in which multiple pixels (e.g., multiple areas 76) are switched simultaneously (e.g., by routing a common signal to multiple adjacent strands 20H and/or multiple adjacent strands 20V). Strands 20V and 20H may be warp and weft strands, respectively, may be weft and warp strands, respectively, or may be other suitable strands in fabric 12. Polymer structures in fabric 12 (e.g., tubing) may be formed from elastomeric materials to facilitate stretching.

Figure 8:
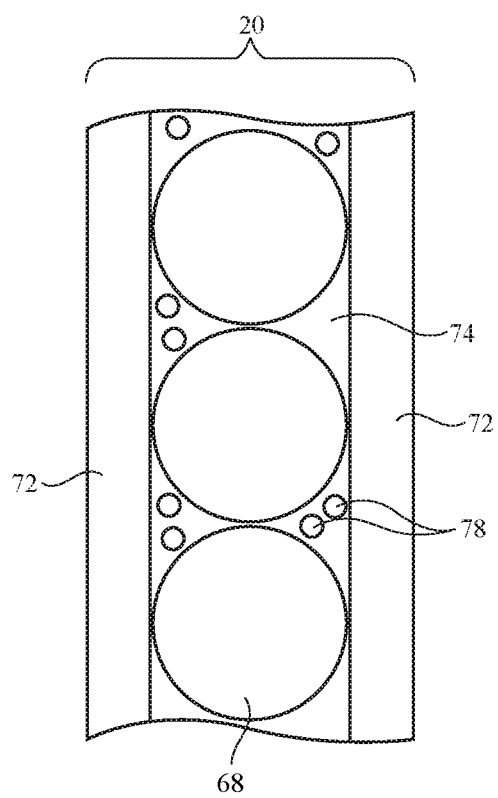
FIG. 8 is a cross-sectional side view of an illustrative strand of tubing containing Janus particles and other particles such as luminescent particles in accordance with an embodiment.
Figure 9:
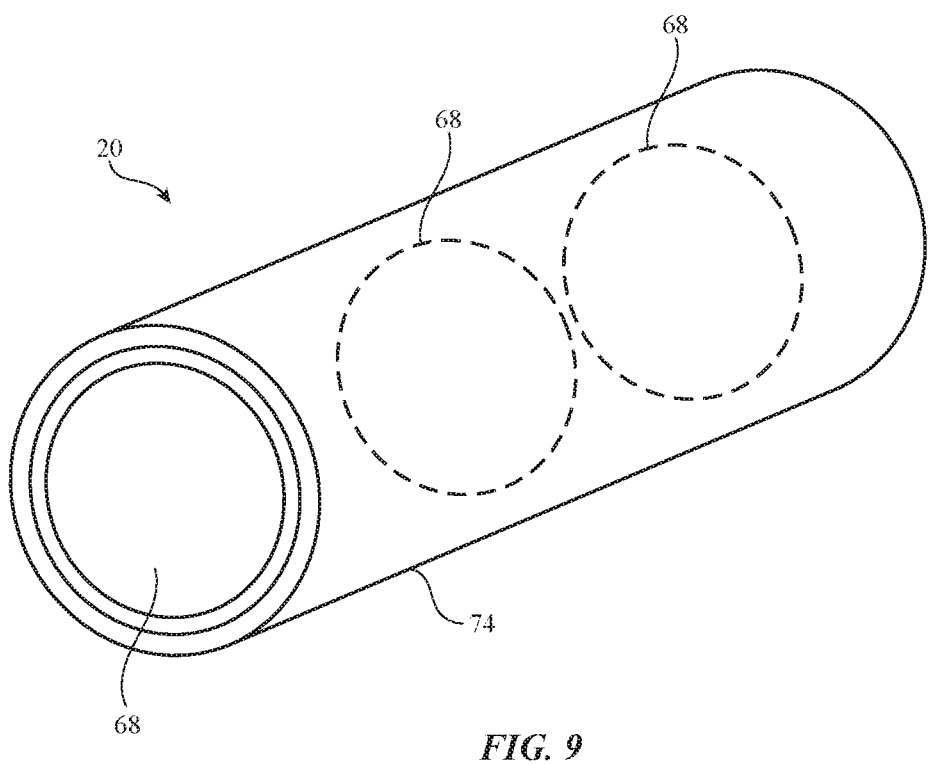
FIG. 9 is a perspective view of illustrative tubing of the type shown in FIG. 8 in accordance with an embodiment.

In the illustrative configuration of FIG. 8, strand 20 includes particles 68 supported in binder 74 (e.g., a clear polymer) within the channel formed by the interior of tubing 72. As shown in FIG. 8, strand 20 may include luminescent particles 78 (e.g., ZnS particles or other luminescent particles in binder 74). Luminescent particles 78 may exhibit electroluminescence and may emit light when signals are applied to particles 78 (e.g., when an alternating current drive signal is applied). A drive signal may be applied to particles 78 using electrodes. The electrodes may be formed on walls 72, may be formed from conductive structures in intersecting strands such as conductive structures in strands 20H of FIG. 7, may be formed from overlapping planar electrode structures on fabric 12, and/or may be formed using other electrode structures. FIG. 9 is a perspective view of an illustrative strand such as strand 20 of FIG. 8 having a cylindrical channel into which particles 68 (e.g., spherical particles) have been incorporated. Tubing of other shapes may be used in fabric 12, if desired.

Figure 10:
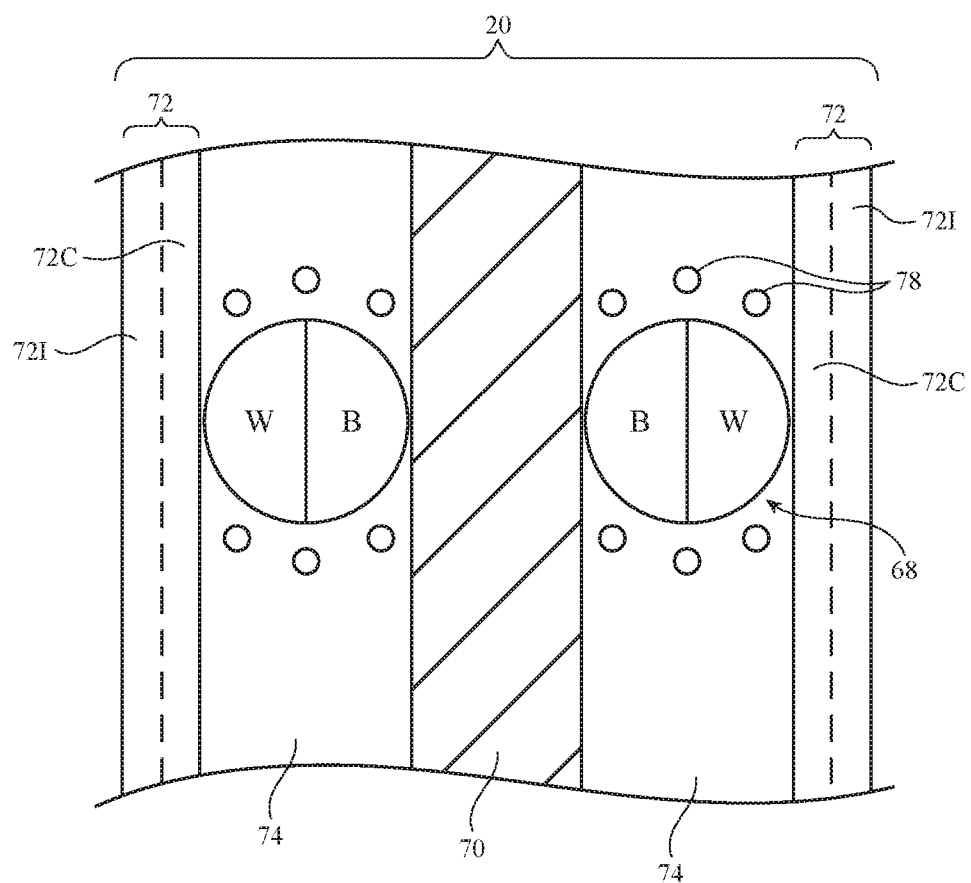
FIG. 10 is a diagram of an illustrative strand of tubing with a center conductor and an outer conductive coating that form control electrodes for electrophoretic ink structures such as Janus particles containing nanoparticles in fluid contained within spherical encapsulation structures in the tubing in accordance with an embodiment.

FIG. 10 is a diagram of an illustrative strand with coaxial electrodes and particles 68. The cross-sectional diagram of strand 20 of FIG. 10 shows how tubing wall 72 may include an insulating outer portion such as outer portion 72I and a conductive inner portion such as inner portion 72C. Portion 72I may, for example, form the wall of a clear polymer tube. Portion 72C may be a transparent conductive coating (e.g., indium tin oxide, metal that is sufficiently thin to be transparent, conductive polymer, etc.) formed on an inner surface of portion 72I or other suitable area of portion 72I. Clear polymer binder 74 may support particles 68 and center conductor in the arrangement of FIG. 10. Electroluminescent particles 78 in binder 74 may emit light in response to alternating current signals (e.g., signals at a frequency of 500-1500 Hz, at least 100 Hz, less than 3000 Hz, or other suitable frequency and a voltage of 50-150 V, at least 30 V, less than 300 V, etc.) applied between the outer signal path formed from tubular conductive layer 72C and the inner signal path formed from central conductor 70.

Particles 68 of strand 20 of FIG. 10 may be adjusted between different configurations by application of direct-current (DC) control signals between conductive coating 72C and central conductor 70. For example, particles 68 may be adjusted between a first arrangement in which white particles W are moved outwardly while black nanoparticles B are moved inwardly as shown in FIG. 9 and an alternative second arrangement in which the black nanoparticles are moved inwardly and which the white nanoparticles are moved outwardly, thereby dynamically changing the appearance of an area of fabric 12 in which these changes are being made. If desired, dyes and/or other substances that alter the appearance of strands 20 may be included in strands 20. For example, dye may be incorporated into walls 72, binder 74, particles 68, etc.

Figure 11:
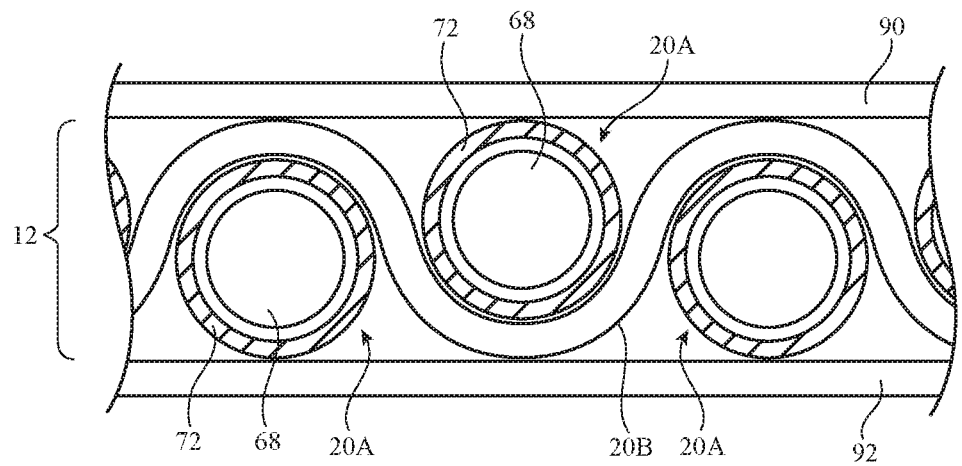
FIG. 11 is a side view of illustrative fabric having electrode layers for applying control signals to electrophoretic ink structures contained in strands of tubing in the fabric in accordance with an embodiment.

FIG. 11 is a side view of illustrative fabric 12 having electrodes such as upper electrode layer 90 and lower electrode layer 92 for applying control signals to electrophoretic ink in strands 20 (e.g., electrophoretic ink contained in particles 68 in strands 20 of fabric 12 such as strands 20A and 20B). Particles 68 may be contained within the interior of tubing walls 72. Electrode 90 and/or electrode 92 may be formed from transparent conductive material such as conductive adhesive, indium tin oxide, metal that is sufficiently thin to be transparent, and/or other conductive material and may, if desired, be formed from a conductive layer (e.g., indium tin oxide, conductive polymer, etc.) on an insulating substrate (e.g., a clear insulating polymer). Electrode 90 and/or electrode 92 may be pixelated (e.g., to form an array of individually adjustable pixels in fabric 12 that serve as a display or other visual output device) and/or may be patterned in other shapes.

Figure 12:
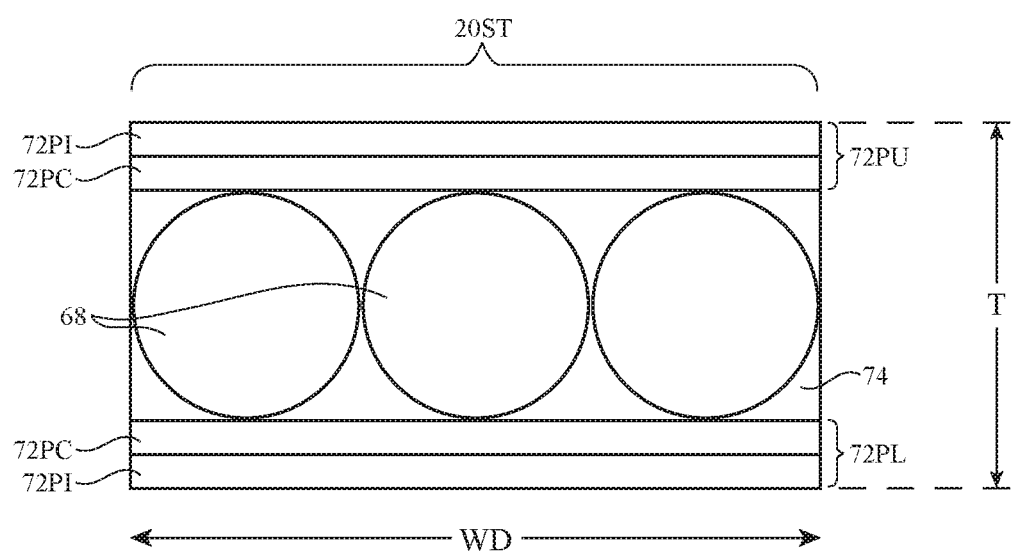
FIG. 12 is a cross-sectional side view of an illustrative strip-shaped strand containing electrophoretic ink structures such as Janus particles in accordance with an embodiment.

FIG. 12 is a cross-sectional view of an illustrative strip-shaped planar structure with electrophoretic ink. As shown in FIG. 12, strip 20ST may include particles 68 containing electrophoretic ink. Particles 68 may be embedded in binder 74 (e.g., transparent polymer) between upper planar layer 72PU and lower planar layer 72PL and may extend along a longitudinal axis that runs into the page in the orientation of FIG. 12. An upper electrode for strip 20ST may be formed from a conductive layer (e.g., an upper conductive layer 72PC) supported on a substrate (e.g., an upper dielectric substrate layer 72PI) in layer 72PU. A lower electrode for strip 20ST may be formed from a conductive layer (e.g., a lower conductive layer 72PC) supported on a substrate (e.g., a lower dielectric substrate layer 72PI) in lower layer 72PL. Substrates 72PI may be formed from sheets of transparent polymer or other flexible insulating layers. Conductive layers 72PC may be formed from transparent conductive materials such as indium tin oxide, conductive polymer, thin layers of metal (e.g., metal that is sufficiently thin to be transparent), or other conductive materials.

Strip 20ST may have a width WD and a thickness T. The value of width WD may be less than the value of thickness T. Width WD and/or thickness T may be, for example, 10-1000 microns, at least 3 microns, at least 30 microns, at least 300 microns, less than 1500 microns, less than 400 microns, less than 300 microns, less than 200 microns, less than 100 microns, less than 50 microns, or other suitable value. If desired, strip 20ST may be sufficiently long and thin to form a strand (e.g., one of strands 20) that is woven, knit, braided, or otherwise intertwined with other strands 20 to form fabric 12 and/or may be incorporated into item 10 using other techniques (e.g., by attaching strip 20ST to a housing structure, by forming strip 20ST as a portion of a housing, etc.).

Figure 13:
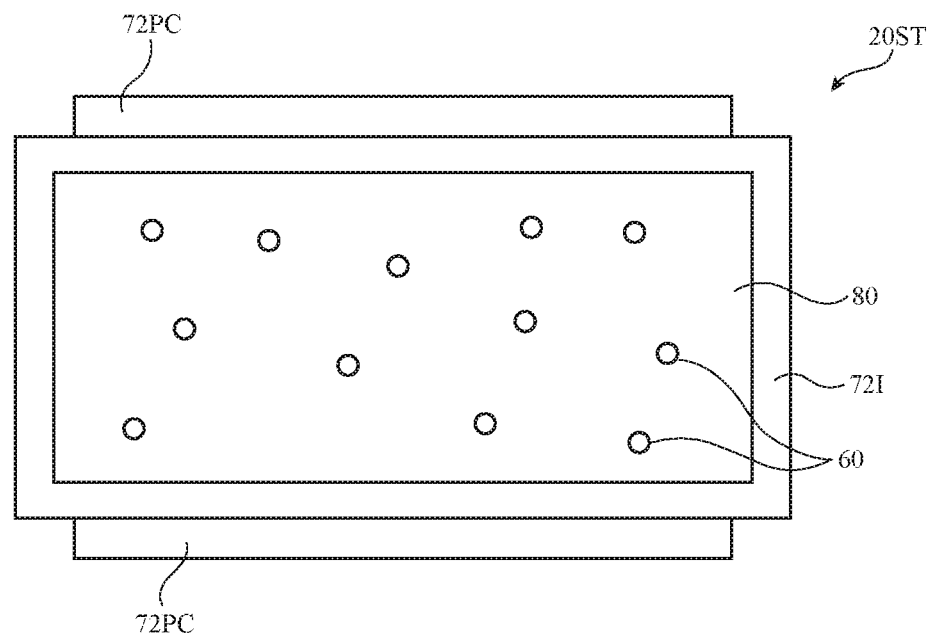
FIG. 13 is a cross-sectional side view of a strand of rectangular tubing having electrodes for controlling electrophoretic ink in accordance with an embodiment.

FIG. 13 is a cross-sectional view of an illustrative strip-shaped structure (strip 20ST) such as a strand of tubing. Strip 20ST may have a clear polymer or other material forming an enclosing wall such as wall 721. Wall 721 may form an encapsulation structure for electrophoretic ink containing nanoparticles 60. In this configuration, the tubing of strand 20ST surrounds and encapsulates nanoparticles 60 directly without any additional particle-sized encapsulation structures such as encapsulation structure 64 of particle 68 in FIG. 6. Strand 20ST of FIG. 13 has the shape of a rectangular tube (e.g., tubing that has a longitudinal axis that extends into the page in the orientation of FIG. 13). Nanoparticles 60 may be formed within the fluid in interior cavity 80 of tubing wall 721. In the example of FIG. 13, the tubing formed by wall 721 has a rectangular cross-sectional profile (e.g., wall 721 and cavity 80 have rectangular cross-sectional profiles). Tubing with other suitable cross-sectional profiles may be used to form an encapsulation structure for electrophoretic ink, if desired (e.g., oval tubing, circular tubing, tubing with multiple parallel channels, etc.).

Strip 20ST of FIG. 13 may have transparent conductive coatings that are patterned to form electrodes. In the example of FIG. 13, these electrodes include an upper electrode formed from conductive coating layer 72PC on the upper outer surface of a tubular wall 721 and an opposing lower electrode formed from an opposing conductive coating layer 72PC on the opposing lower outer surface of tubular wall 721. Configurations in which conductive electrodes are formed from structures on the inner surfaces of wall 721 may also be used.

Figure 14:
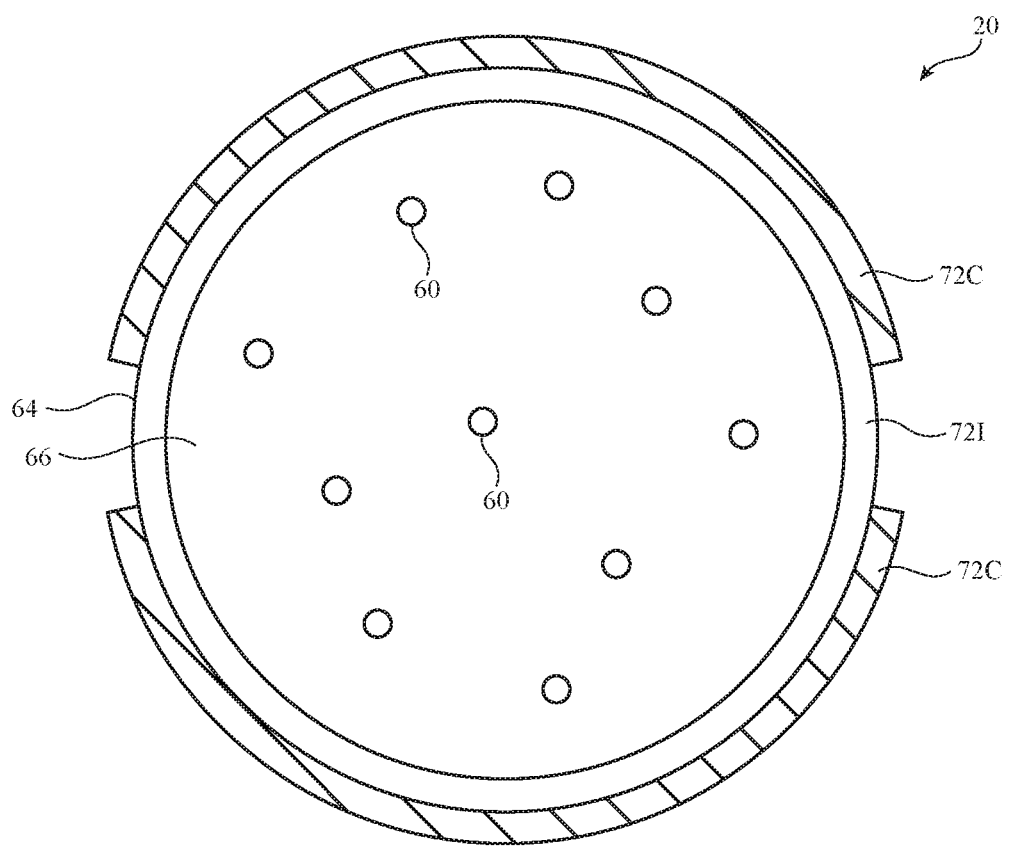
FIG. 14 is a cross-sectional side view of an illustrative strand of tubing with electrophoretic ink and a pair of opposing electrodes that run along the length of the tubing in accordance with an embodiment.

FIG. 14 is a cross-sectional view of an illustrative strand formed from circular tubing. As shown in FIG. 14, tubing wall 721 of strand 20 may be formed from a circular structure (e.g., a hollow polymer tube with a circular cross-sectional profile). Tubing wall 721 may surround electrophoretic ink with nanoparticles 60 without any intervening encapsulation structures (e.g., without encapsulation structure 64 of FIG. 6). Electrodes 72C may be formed from transparent conductive layers that run along the length of tubing wall 721. Electrodes 72C are not shorted to each other, so that electric fields can be generated by applying a voltage across electrodes 72C.

Figure 15:
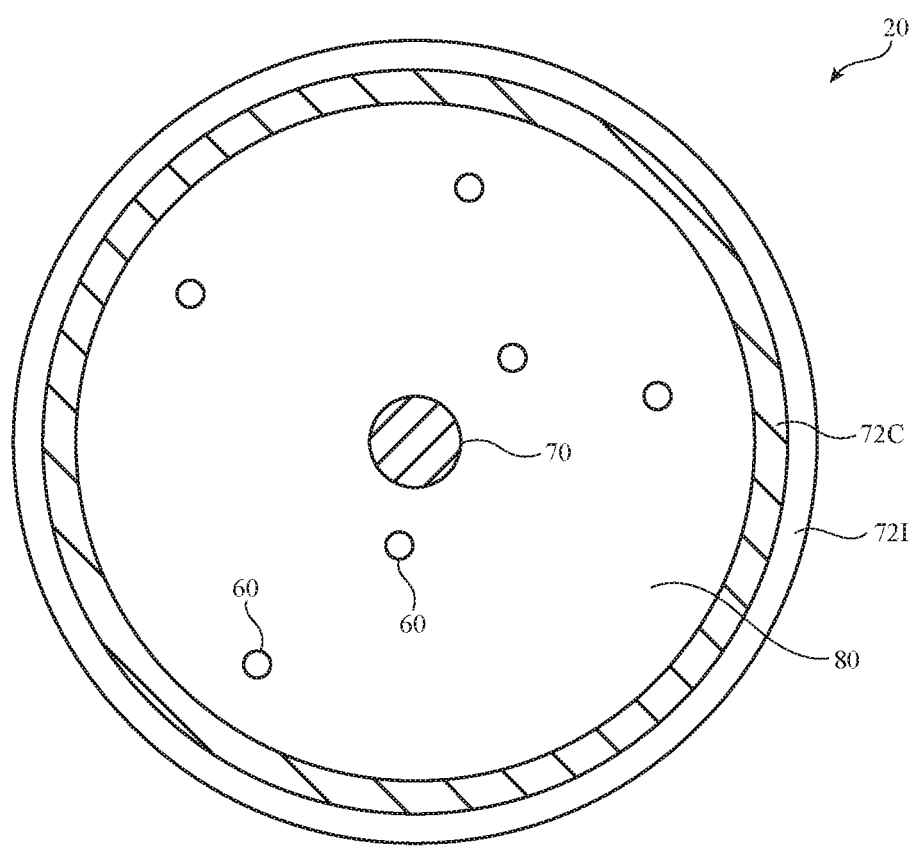
FIG. 15 is a cross-sectional view of an illustrative strand of tubing with electrophoretic ink and coaxial electrodes in accordance with an embodiment.

As described in connection with FIG. 10, strand 20 may be formed from tubing have a coaxial electrode configuration. This may help provide strands 20 and fabric 12 with a uniform appearance, even if some of strands 20 twist within fabric 12 during use of item 10. In the example of FIG. 15, strand 20 has coaxial electrodes and encapsulates electrophoretic ink without using particles 68.

As shown in the cross-sectional view of the illustrative strand of tubing with coaxial electrodes of FIG. 15, strand 20 may have tubing formed from insulating tubing wall 721 (e.g., a clear polymer tube). The inner surface of tubing wall 721 may be formed with transparent conductive material such as coating layer 72C. Layer 72C may form an outer electrode. Center electrode 70 may be formed from a wire or other conductive strand and may form an inner electrode for strand 20. Cavity 80 in the tubing of FIG. 15 may form an elongated channel that runs along the length of strand 20 (e.g., along the longitudinal axis of strand 20, which runs into the page in the orientation of FIG. 15). The wire or other conductive strand forming center electrode 70 may be supported along its length by periodic radial support structure (e.g., clear polymer posts that extend radially between electrode 70 and electrode 72C, clear polymer disks (e.g., solid disks or disks with openings) that extend between electrode 70 and electrode 72C, etc. The appearance of electrophoretic ink with nanoparticles 60 in cavity 80 may be controlled by applying control signals between the inner and outer electrodes of strand 20. When control circuitry (see, e.g., circuitry 16) in item 10 applies a first voltage, particles 60 of a first charge (e.g., white particles) will be attracted outwardly towards electrode 72C while particles 60 of a second charge (e.g., black particles) will be attracted inwardly towards electrode 70. When a second voltage (e.g., a voltage with reversed polarity with respect to the first voltage) is applied between the inner and outer electrodes of strand 20, the black nanoparticles of the electrophoretic ink in cavity 80 will be forced outwardly and the white particles will be forced inwardly. In this way, fabric 12 can be adjusted between a first appearance (e.g., white) and a second appearance (e.g., black). Other suitable colors can be provided in strands 20 (e.g., by using differently colored materials when forming electrophoretic ink, etc.).

The foregoing is merely illustrative and various modifications can be made to the described embodiments. The foregoing embodiments may be implemented individually or in any combination.

What is claimed is:

1. A fabric-based item comprising:
  a layer of fabric formed from woven warp and weft strands of conductive tubing, wherein the conductive tubing includes tubing walls surrounding electrophoretic ink and electroluminescent particles; and
  control circuitry configured to adjust electric fields supplied to the electrophoretic ink by adjusting a voltage applied to the conductive tubing.

2. The fabric-based item defined in claim 1 wherein the warp and weft strands of conductive tubing comprise clear polymer tubing walls and transparent conductive material on the clear polymer tubing walls, wherein the fabric-based item further comprises first electrodes formed from the transparent conductive material on the clear polymer tubing walls and second electrodes, and wherein the control circuitry is configured to apply the electric fields to the electrophoretic ink using the first and second electrodes.

3. The fabric-based item defined in claim 1 wherein the conductive tubing includes transparent polymer tubing walls.

4. The fabric-based item defined in claim 3 further comprising electrodes with which the control circuitry applies the electric fields.

5. The fabric-based item defined in claim 4 wherein the electrodes include an electrode formed from at least part of the conductive tubing.

6. The fabric-based item defined in claim 5 wherein the electrode is a transparent electrode.

7. The fabric-based item defined in claim 4 wherein the electrodes include first and second electrodes formed from at least part of the conductive tubing.

8. The fabric-based item defined in claim 4 wherein the electrodes are coaxial electrodes and include a first electrode formed from part of the conductive tubing and a second electrode formed from a conductive strand in the conductive tubing.

9. The fabric-based item defined in claim 1 further comprising spherical encapsulation structures in the conductive tubing, wherein the electrophoretic ink is within the spherical encapsulation structures.

10. The fabric-based item defined in claim 9 further comprising binder in the conductive tubing, wherein the spherical encapsulation structures and the electroluminescent particles are embedded in the binder.

11. The fabric-based item defined in claim 1 wherein the layer of fabric includes additional conductive weft strands configured to apply the electric fields, and wherein the additional conductive weft strands and the warp strands of conductive tubing run orthogonally to each other in the fabric.

12. A fabric-based item comprising:
  fabric comprising:
    strands of conductive tubing containing electrophoretic ink formed from fluid with charged nanoparticles, wherein each of the strands comprises a conductor held at a fixed potential; and
    conductive strands that cross the strands of conductive tubing; and
  control circuitry configured to alter an appearance of a first portion of the fabric relative to a second portion of the fabric by adjusting a voltage applied to the conductive strands that cross the first portion to adjust an electric field applied to the electrophoretic ink in the strands of conductive tubing in the first portion.

13. The fabric-based item defined in claim 12 further comprising encapsulation spheres in the strands of conductive tubing.

14. The fabric-based item defined in claim 13 wherein each encapsulation sphere includes some of the fluid with charged nanoparticles, the fabric further comprising:
  binder in the strands of conductive tubing;
  electroluminescent particles in the binder.

15. The fabric-based item defined in claim 14 wherein the charged nanoparticles include nanoparticles of opposing first and second charge polarities with respective first and second different colors and wherein the fabric comprises woven fabric.

16. Fabric, comprising:
  intertwined strands of conductive tubing each including a first electrode formed from a transparent material and a second electrode; and
  electrophoretic ink and luminescent particles in the intertwined strands of conductive tubing, wherein the electrophoretic ink in each of the intertwined strands of conductive tubing is configured to change color in response to a change in voltage applied to the first and second electrodes.

17. The fabric defined in claim 16 further comprising:
  clear polymer binder; and
  encapsulation structures in the clear polymer binder that are each filled with some of the electrophoretic ink.

* * * * *